May 20, 1952   W. L. McGUINNESS   2,597,160

ANTISKID DEVICE FOR AUTOMOBILE TIRES AND THE LIKE

Filed Oct. 4, 1950

INVENTOR.
BY Walter L. McGuinness
Bryn Beecher
ATTORNEY

Patented May 20, 1952

2,597,160

UNITED STATES PATENT OFFICE 2,597,160

ANTISKID DEVICE FOR AUTOMOBILE TIRES AND THE LIKE

Walter L. McGuinness, Waltham, Mass.

Application October 4, 1950, Serial No. 188,322

6 Claims. (Cl. 152—237)

My invention relates to a device for increasing the traction and skid resistance of automobile tires and the like, and more particularly concerns a device of this character which is adapted for application to tires mounted on disc wheels of the type having spaced slots around the outer margin of the disc.

A principal object of the invention is to provide a device effective for the purpose indicated, which can be speedily applied to the tire, which will not tend to loosen, creep or become detached during use, and which is quickly removed.

My device comprises, in addition to one or more road engaging elements, as metal chains, a substantially U-shaped, felly-straddling band by means of which the device is fastened about the tire. One leg of this band is detachably connectable, as in hasp and staple fashion, to a cross piece which is linked to the road-engaging element or elements at one end thereof, the cross piece, in the preferred construction, being formed to provide a guideway for the leg of the band. To avoid the possibility of accidental disengagement of the cross piece and band in use of the device, a locking member is provided having a portion formed to be looped about the leg of the band and portions adapted to be held tightly against the cross piece. In the preferred construction the means for so holding these latter portions against the cross piece takes the form of another cross piece which is linked to the first cross piece through resilient means and which serves as a handle in the application of the device to the tire.

I shall describe my invention in its preferred embodiment with the aid of the accompanying drawings, in which.

Figure 2:
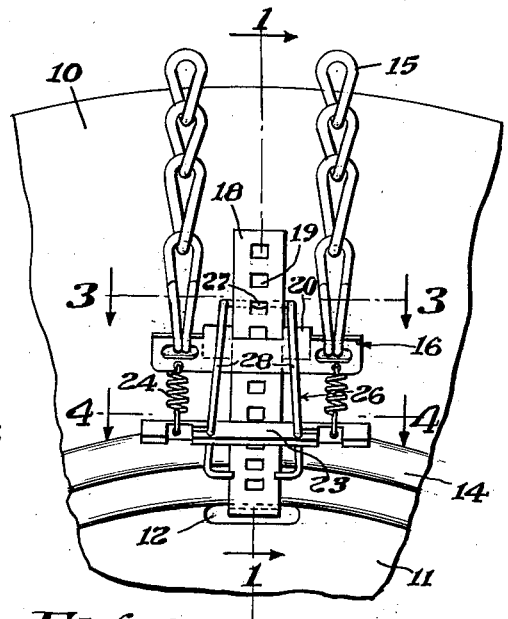
Fig. 2 is an elevation illustrating the device as applied to a tire.
Figure 3:
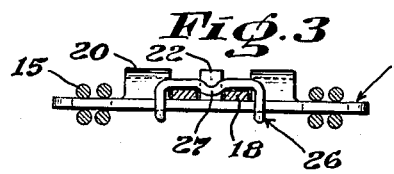
Figure 4:
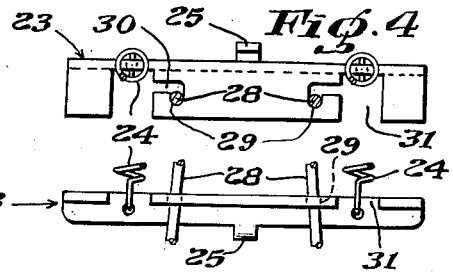
Figures 5, 6:
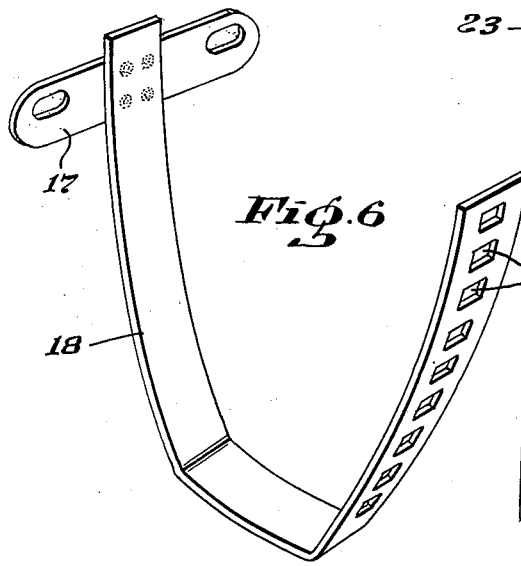

Figs. 3 and 4 are plan views taken on the lines 3—3 and 4—4 of Fig. 2;

Fig. 5 is an elevation of the part shown in plan in Fig. 4;

Fig. 6 is an enlarged perspective view of the band member; and

Figure 7:
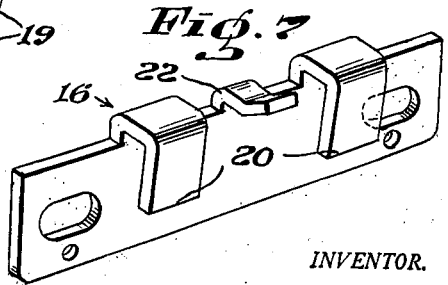

Fig. 7 is an enlarged perspective view showing the inner face of the cross piece appearing in plan in Fig. 3.

Figure 1:
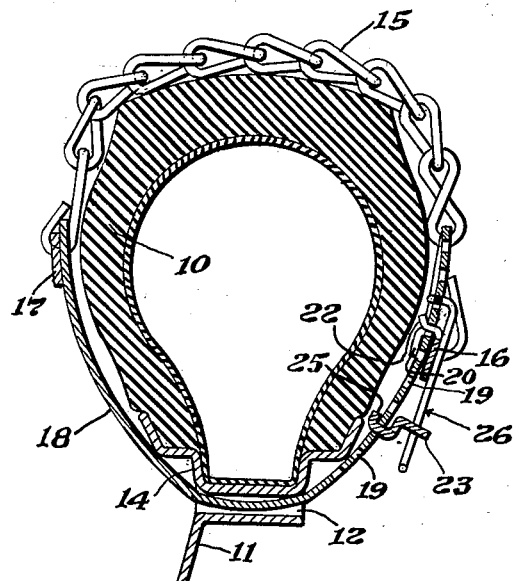
Fig. 1 is a section on the line 1—1 of Fig. 2.

Referring first particularly to Figs. 1 and 2, the tire 10 is shown as mounted on a disc wheel 11 having spaced marginal slots 12. Rim 14 is integral with the wheel.

Extending across the tread of the tire are chains 15, connected at their ends to cross pieces 16 and 17, these being suitably apertured to receive the terminal links of the chains. If desired, cross piece 17, shown as spot-welded to band or strap 18, may be detachably connected thereto. This band passes through the aperture 12, straddles the felly or rim 14 and partially encircles the tire. It may be conveniently formed by stamping from sheet metal. While the metal must be capable of taking a set, it should possess a substantial measure of resiliency.

Downturned flanges 20 (Fig. 7) spaced equidistant from the ends of cross piece 16 provide a guideway for the band 18, the width of the guideway approximating that of the band. The purpose of the guideway is to prevent lateral or rocking movement of the band relative to the cross piece.

A hook element 22, shown as integral with the cross piece 16 and positioned mediate the flanges 20, is receivable in any one of the apertures 19 in the band 18. The peculiar shape of this hook element facilitates its insertion in the selected aperture.

Cross piece 23 serves as a handle in the insertion of the hook 22 in an aperture providing a tight fit. This member is connected to cross piece 16 by springs 24 or other resilient means, and itself comprises a hook 25 receivable in any of the apertures 19 in the band 18.

A most important part of the device is the wire locking element 26, which operates to prevent accidental unseating of the hook 22 with resultant loosening of the device. This element will be noted as distorted in its area behind the band 18 (Figs. 2 and 3), the distortion providing a portion 27 seating in one of the apertures 19 above the cross piece 16. The legs 28, which overlie and bear on the cross piece, and which are tensioned so as to resist being spread apart, snap into complementary recesses 29 in the cross piece 23, access to these recesses being had through notches 30 which communicate with wider notches 31 disposed at right angles thereto. The slight downward bowing of the legs 28 incident to the seating of the legs in the recesses so tensions the legs as to preclude the possibility of the legs slipping out of the recesses.

To apply the device, the apertured leg of the band 18 is thrown over the tread of the tire (from the right in Fig. 1) and the end of the band passed through the slot 12. After such leg of the band has been pulled upward to properly position the chains across the tread, cross piece 23 is pulled downward until the hook 22 of the cross piece 16 is adjacent the proper aperture, the band during this stage being pressed inward. With the hook 22 in the proper aperture, cross piece 23 is pulled further downward to tension the springs 24 and the hook 25 inserted. Thereafter the wire locking element 26 is applied by looping it over and behind the band and working the legs 28 as necessary to seat them in the recesses 29.

Apart from its primary function of preventing disengagement of the hook 22 and the band, the wire lock piece 26 represents a convenient tool for use in removing the device from the tire. In this connection, the legs 28, after the lock has been removed, are re-inserted in the notches or slots 30 from below the cross piece 23 (Fig. 2) and the lock employed as a lever by lifting up to unseat the hook 25. The unseating of this hook and the resultant freeing of the cross piece 23 relieves the tension on the hook carried by the upper cross piece, simplifying its disengagement.

My invention is not to be restricted to the precise details of construction shown in the drawings, since various changes and modifications obviously may be made without departing from the scope of the invention or sacrificing the advantages derived from its use.

I claim:

1. In an emergency traction device for automobile tires and the like, said device including one or more road-engaging elements, a felly-straddling band, and a pair of cross pieces through which the ends of the road-engaging element or elements are connected to the band, one of these connections being a detachable connection comprising complementary fastening means associated with the particular cross piece and the corresponding leg of the band, the combination of a member serving to prevent accidental disengagement of said cross piece and said leg having a portion formed to be looped about said leg and a portion adapted to overlie said cross piece, and means for holding said last-mentioned portion tightly against said cross piece.

2. In an emergency traction device for automobile tires and the like, said device comprising one or more road-engaging elements, a felly-straddling band, and a pair of cross pieces through which the ends of the road-engaging element or elements are connected to the band, one of the cross pieces being adapted to overlie the outer face of the corresponding leg of the band and having a hook associated therewith receivable in an aperture in the said leg of the band, the combination of a member for maintaining the hook in the aperture on use of the device, said member having a portion formed to be looped behind said leg and leg portions adapted to overlie the outer face of said cross piece, and means for holding said leg portions tightly against said face.

3. In an emergency traction device for automobile tires and the like, said device including one or more road-engaging elements, a felly-straddling band, and a pair of cross pieces through which the ends of the road-engaging element or elements are connected to the band, one of the cross pieces being adapted to overlie the outer face of the corresponding leg of the band and having a hook element associated therewith receivable in any one of a plurality of apertures in the said leg of the band, the combination of locking means for maintaining said hook in a selected aperture on use of the device, said locking means comprising a wire member having a portion formed to be looped behind said leg and leg portions adapted to overlie the outer face of said cross piece, the loop portion of said member being distorted so as to seat in an aperture in said leg above the aperture in which the hook is inserted, and means for holding said leg portions of the wire member tightly against the outer face of said cross piece.

4. In an emergency traction device for automobile tires and the like, said device including one or more road-engaging elements, a felly-straddling band, and a pair of cross pieces through which the ends of the road-engaging element or elements are connected to the band, one of these connections being a detachable connection comprising complementary fastening means associated with the particular cross piece and the corresponding leg of the band, the combination of means serving to prevent accidental disengagement of said cross piece and said leg on use of the device, said means comprising a wire member having a portion formed to be looped about said leg and leg portions adapted to overlie said cross piece, and a third cross piece for holding said leg portions tightly against said particular cross piece.

5. In an emergency traction device for automobile tires and the like, said device including one or more road-engaging elements, a felly-straddling band, and a pair of cross pieces through which the ends of the road-engaging element or elements are connected to the band, one of the cross pieces being adapted to overlie the outer face of the corresponding leg of the band and having a hook element associated therewith receivable in any one of a plurality of apertures in the said leg of the band, the combination of locking means serving to maintain said hook in a selected aperture on use of the device, said locking means comprising a wire member having a portion formed to be looped behind said leg and leg portions adapted to overlie the outer face of said cross piece, the loop portion of said wire member being distorted so as to seat in an aperture in said leg of the band above said cross piece, and a third cross member for holding the leg portions of said wire member tightly against the outer face of said cross piece, said third cross member being connected to said cross piece through resilient means and carrying a hook receivable in apertures in said leg of the band.

6. A device according to claim 5 in which said cross piece is shaped to provide a guideway for said leg of the band.

WALTER L. McGUINNESS.

REFERENCES CITED

The following references are of record in the file of this patent:

UNITED STATES PATENTS

| Number | Name | Date |
| --- | --- | --- |
| 2,453,426 | Freed | Nov. 9, 1948 |
| 2,461,737 | Huffman et al. | Feb. 15, 1949 |